United States Patent
Cook

(10) Patent No.: US 6,842,434 B1
(45) Date of Patent: Jan. 11, 2005

(54) METHOD AND SYSTEM FOR SHARING CDMA DATA TRAFFIC CHANNEL AMONG MULTIPLE USERS

(75) Inventor: Charles I. Cook, Louisville, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/223,744

(22) Filed: Dec. 31, 1998

(51) Int. Cl.[7] .............................................. H04B 7/185
(52) U.S. Cl. ..................................... 370/318; 455/13.4
(58) Field of Search .................................. 370/312, 320, 370/335, 342, 341, 468, 318, 329, 311, 331, 436, 439, 441, 449; 455/13.4, 522

(56) References Cited

U.S. PATENT DOCUMENTS

| | | | |
|---|---|---|---|
| 5,745,480 A | * | 4/1998 | Behtash et al. ............ 370/252 |
| 5,887,252 A | * | 3/1999 | Noneman ................... 370/335 |
| 5,933,781 A | * | 8/1999 | Willenegger et al. ....... 455/522 |
| 5,963,548 A | * | 10/1999 | Virtanen ..................... 370/335 |
| 6,064,663 A | * | 5/2000 | Honkasalo et al. ......... 370/335 |
| 6,069,883 A | * | 5/2000 | Ejzak et al. ................ 370/335 |
| 6,137,789 A | * | 10/2000 | Honkasalo .................. 370/342 |
| 6,219,341 B1 | * | 4/2001 | Varanasi ..................... 370/252 |
| 6,259,721 B1 | * | 7/2001 | Uesugi et al. .............. 370/335 |
| 6,285,665 B1 | * | 9/2001 | Chuah ........................ 370/319 |

* cited by examiner

*Primary Examiner*—Dang Ton
*Assistant Examiner*—Phuc Tran
(74) *Attorney, Agent, or Firm*—Townsend and Townsend and Crew LLP

(57) ABSTRACT

A method and system are provided for increasing channel usage efficiency of data transmissions in a code division multiple access (CDMA) communication system by assigning more than one user wireless communication device to a single data channel. A base station is arranged to communicate CDMA data signals with a plurality of wireless communication devices in the form of data packets. A wireless communication device generates a request for assignment of an identification key code as part of a call initiation process. The base station then assigns an identification key code to the requesting wireless communication device which is transmitted in a header of each data packet. The base station also sets a level of transmission power for the wireless communication devices as a function of the number of wireless communication devices assigned to the data channel and the available bandwidth of the channel. Either a unique key code can be assigned, or a common key code allowing a selected grouping of users to receive broadcast data packets. The present invention is also applicable to the reverse link.

8 Claims, 2 Drawing Sheets

METHOD AND SYSTEM FOR SHARING CDMA DATA TRAFFIC CHANNEL AMONG MULTIPLE USERS

TECHNICAL FIELD

The present invention relates generally to code division multiple access (CDMA) communication systems and, more particularly, to an improved data traffic channel assignment for CDMA communication systems.

BACKGROUND ART

Code division multiple access (CDMA) is a technique used in wireless communications systems, such as personal communication service (PCS) systems which provide integrated wireless data services, for permitting simultaneous access by multiple wireless devices to a single uplink voice channel of a base station. In CDMA, a digital carrier signal is modified by a code uniquely identifying a particular wireless device, thus effectively spreading the digital signal over a greater bandwidth. For example, a 10 kHz signal may be modulated with a code that effectively creates a 100 kHz-spread signal. This is also true in the downlink direction.

The spread signal modulates a carrier frequency signal that is in the range of the uplink frequency channel. The modulated carrier is then transmitted from the wireless device to the base station. The base station receives a composite spread signal of all the modulated carrier frequency signals from all wireless devices transmitting at that point in time. The base station demodulates the composite spread signal and then despreads the demodulated signal using the same unique code used at a particular wireless device for spreading. The despread signal approximates the pre-spreading data signal for the particular wireless device. Again, this is true in the downlink direction.

Within a sector of a base station, the population of PCS users can be split into fixed and mobile wireless users. A fixed user is a user that stays in place or moves at a relatively low rate of speed such as when walking during a call. A mobile user is a user that moves at a relatively high rate of speed such as when traveling in a vehicle during a call. All users are located within a sector of the base station for wireless communication with the base station.

Typically, each user/subscriber device in the sector is allocated the same amount of power to communicate with the base station. The measure of power allocated to each user is defined as the ratio of energy per bit to the noise power spectral density (Eb/No). The Eb/No level for each user is measured at the base station. The base station then signals the subscriber device to adjust transmit power through a control loop so that the receive signal strength at the base station from all transmitting subscriber devices is approximately the same. System traffic capacity is limited to a finite amount of bandwidth. Thus, utilization of this capacity must be as efficient as possible.

Adding to the problem of finite system capacity, known systems that provide integrated data services require dedication of a single traffic channel for each user. In other words, the traffic channel is not shared. However, with such an arrangement, efficiency in system capacity utilization is compromised. Consequently, a need exists for a system and method which can assign data traffic channels to multiple users in a wireless communication system which improves efficiency of system utilization.

SUMMARY OF THE INVENTION

Accordingly, it is an object of the present invention to provide a method and system for assigning a single traffic channel to more than one user in a PCS wireless arrangement.

It is another object of the present invention to provide a method and system for assigning a single traffic channel to more than one user in a wireless data communication system to reduce the number of transmitters and receivers required at a base station.

It is yet another object of the present invention to provide a method and system for assigning a data traffic channels in a wireless communication system which improves channel utilization while also supporting broadcast services.

In carrying out the above objects and other objects, the present invention provides a method and system for assigning a plurality of wireless communication devices to a single data traffic channel within a sector of a base station of a code division multiple access (CDMA) communication system. The base station is arranged to communicate CDMA data signals with a plurality of wireless communication devices in the form of data packets. When a wireless communication device initiates a data call, the device generates a request for assignment of an identification key code as part of a call initiation process. The base station then assigns an identification key code to the requesting wireless communication device which is transmitted in a header of each data packet. The base station also sets a level of transmission power for the wireless communication devices as a function of the number of wireless communication devices assigned to the data channel, the available bandwidth of the channel, and the received signal strength power control loop from the subscriber device. In further accordance with the present invention, either a unique key code can be assigned, or a common key code allowing a selected grouping of users to receive broadcast data packets.

By allowing a plurality of wireless communication devices to share a single data channel, the present invention advantageously increases the efficiency of channel usage. This translates into a base station requiring fewer transmitters/receivers t o support the same number of users. In addition, "push" s services can be supported through use of the broadcast capability of the present invention.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
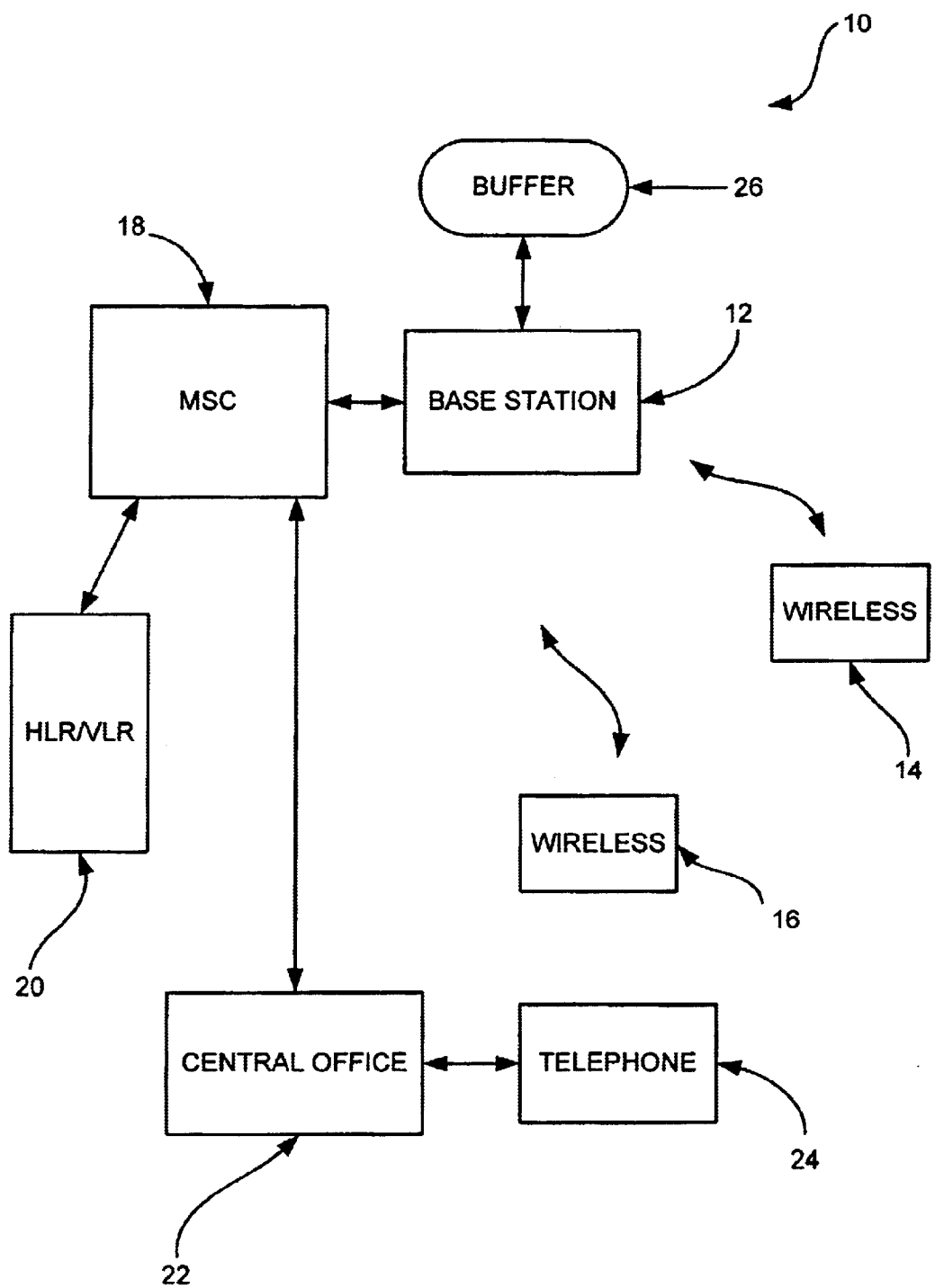
FIG. 1 is a schematic representation of a personal communication service (PCS) system in accordance with the present invention.

A personal communication service (PCS) system 10 is shown in FIG. 1 in accordance with a preferred embodiment of the present invention. More specifically, system 10 includes a base station 12, and multiple user communication devices such as a stationary wireless device 14, and a mobile wireless device 16. For example, stationary wireless devices may include a household telephone which remains in place during communication with base station 12, such as a wireless local loop device. Mobile wireless device 16 can include a hand-held telephone which moves at a relatively slow rate of speed while communicating with base station 12, or a vehicle telephone which moves at a relatively high rate of speed while communicating with base station 12.

Base station 12 communicates with the stationary communication devices 14, and mobile communication devices 16 using code division multiple access (CDMA) signals. Accordingly, base station 12 and communication devices 14 and 16 include appropriate transmitter and receiver circuitry.

PCS system 10 further includes a mobile switching center (MSC) 18 connected to a home location register/visitor location register (HLR/VLR) database 20. Mobile switching center 18 is also connected to a central office 20 via an inter-office trunk. Central office 22 is connected to a wireline phone 22 using a plain old telephone service (POTS) arrangement. In operation, the Eb/No level of each wireless user communication device is measured at the receiver of base station 12 in conjunction with MSC 18. However, such an arrangement is not to be construed as limiting since the present invention is also applicable to wireless communication architectures which may or may not utilize a MSC. Examples of such architectures include wireless PBXs and an integrated wireless/wireline architecture described in commonly owned U.S. patent application Ser. No. 08/826, 615, filed on Apr. 4, 1997, and incorporated by reference herein.

Figure 2:
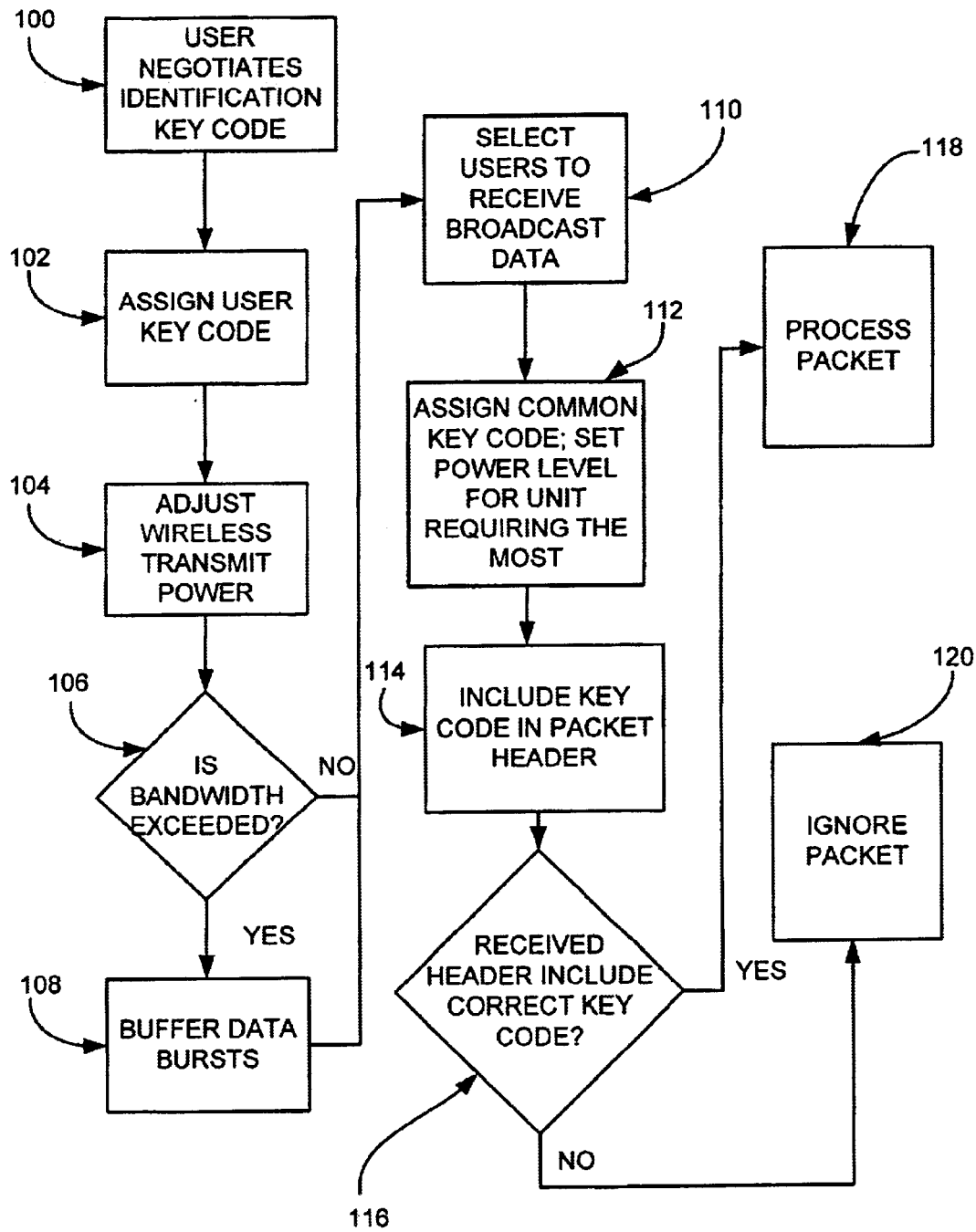
FIG. 2 is a flow diagram representing a overall operation of the present invention.

The data forwarded to the multiple user devices is communicated using a packet transmission format. Each packet includes a header as is understood by one skilled in the art. FIG. 2 provides a flow chart showing the overall operation in accordance with the present invention. As denoted at block 100, a user negotiates a unique user key or identification code when initiating a data call. A system management control processor located in the base station handles the task of assigning a user key code to the user at block 102. However, unlike known systems that require dedication of a data channel to each user, the base station of the present invention assigns multiple users to a single forward or reverse link data channel.

At block 104, the power control information for each assigned user is used to individually control the transmit power of each data burst to permit sharing of the single data channel. The transmit power levels are attenuated using appropriate control signals, with the amount of attenuation set as a function of the number of assigned users and the available bandwidth of the channel. The power transmitted by the wireless device is varied to maintain a constant receive power level at base station 12 from all wireless user communication devices assigned to and using a common data channel to minimize interference and optimize the base station capacity for each channel. In addition, if the base station detects that the combined sources of assigned users exceeds the given bandwidth of a particular data channel at block 106, the base station will buffer the data bursts using a data buffer arrangement 26 at block 108.

In further accordance with the present invention, a set of user devices can be selectively controlled to receive broadcast data, i.e., data transmissions intended for a mass audience such as used in "push" server applications. More specifically, as denoted at block 110, all users that are to receive a common broadcast data packet are assigned a common key instead of unique keys at block 112. In this broadcast application, the base station transmit power level will correspond to the subscriber device requiring the most power for receiving and demodulating the signal. This allows for the data burst to be transmitted once rather then N times where N is the number of receiving subscriber devices. In this case, the dynamic range of current subscriber devices will provide compensation for the power level of transmitted signals received by subscriber devices located closer to the base station than the subscriber device requiring the most power.

During the initiated data call, a user's negotiated key is included in the packet header of any signal being transmitted to that particular user as denoted at block 114. At block 116, each user communication device is arranged to process all received packet headers to determine whether the signal includes a matching key. If header contains the key code, the user communication device processes the data in the received signal at block 118. Otherwise, the user ignores the remainder of the received signal at block 120.

Thus, the present invention provides a method and system which takes advantage of the bursty nature of CDMA data communication in CDMA PCS systems to use power control information and authenticated keys in packet headers to facilitate multiple users sharing a single data traffic channel. While some known CDMA systems transmit at constant power on the forward link, the present invention will result in a significantly lower noise floor. In systems where the transmit power is turned off when there is no data or voice bursts to send, the reduction of the overall noise floor will correlate to the mix of broadcast versus dedicated traffic. However, fewer transmitters/receivers would be required at the base station to support the same number of users.

In addition, the processing time required by each mobile user to process all received packet headers can be further reduced by dividing the data channel into assigned time slots. Appropriate mobile synchronization data is received from the base station/MSC to synchronize the mobiles to each slot. This allows the subscriber devices to reduce power compensation because they would only be on during the predetermined time slot.

While the present invention has been described primarily in context with forward link, the present invention is also applicable to the reverse link. With respect to the reverse link, all subscriber devices must be synchronized such that the signals received at the base station arrive within allocated time slots. Time slot allocation can be negotiated via the control channel, or signaling information can be contained as part of the header information of the data burst in the forward link. A combination of both arrangements provides maximum flexibilty.

While the best mode for carrying out the invention has been described in detail, those familiar with the art to which this invention relates will recognize various alternative designs and embodiments for practicing the invention as defined by the following claims.

What is claimed is:

1. A method for controlling assignment of wireless communication devices to a channel of a code division multiple access (CDMA) communication system, wherein data is transmitted in the form of packets, the method comprising:

receiving a request from a wireless communication device as part of a call initiation process;

assigning a key to the wireless communication device, wherein the key is transmitted in a header of each data packet; and setting a level of transmission power of wireless communication devices as a function of the number of wireless communication devices assigned to the channel, an available bandwidth of the channel, and a power control loop of the wireless communication devices.

2. The method of claim 1, further comprising:

receiving requests from each of a plurality of wireless devices, each request being part of a call initiation process for one of the plurality of wireless devices; and assigning each wireless device a unique key.

3. The method of claim 1, further comprising:

receiving requests from each of a plurality of wireless devices, each request being part of a call initiation process for one of the plurality of wireless devices; and assigning a common key code to each wireless device for transmission of broadcast data packets to be shared by a selected set of wireless communication devices.

4. The method of claim 1, further comprising buffering a data transmission if the combined number of wireless communication devices assigned to a particular data channel exceeds the available bandwidth of the channel.

5. A code division multiple access (CDMA) communication system comprising:

a plurality of wireless communication devices; and a base station arranged to communicate CDMA data signals with the plurality of wireless communication devices in the form of data packets, the base station operable to receive a request from a wireless communication device as part of a call initiation process, assign an identification key code to the wireless communication device which is transmitted in a header of each data packet, and set a level of transmission power of the wireless communication devices as a function of the number of wireless communication devices assigned to the data channel, an available bandwidth of the channel, and a power control loop of the wireless communication devices.

6. The system of claim 5 wherein the identification key code comprises a unique key code.

7. The system of claim 5 wherein the identification key code comprises a common key code for transmission of broadcast data packets to be shared by a selected set of wireless communication devices.

8. The system of claim 5 wherein the base station further comprises a data buffering arrangement, wherein the base station is operable to buffer data transmissions if the combined number of wireless communication devices assigned to a particular data channel exceeds the available bandwidth of the channel.

* * * * *